United States Patent
Dettinger et al.

(10) Patent No.: US 8,010,561 B2
(45) Date of Patent: *Aug. 30, 2011

(54) TECHNIQUES FOR SHARING PERSISTENTLY STORED QUERY RESULTS BETWEEN MULTIPLE USERS

(75) Inventors: Richard D. Dettinger, Rochester, MN (US); Judy I. Djugash, New Brighton, MN (US); Daniel P. Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 439 days.

This patent is subject to a terminal disclaimer.

(21) Appl. No.: 12/175,309

(22) Filed: Jul. 17, 2008

(65) Prior Publication Data
US 2008/0275857 A1    Nov. 6, 2008

Related U.S. Application Data

(63) Continuation of application No. 10/879,812, filed on Jun. 29, 2004, now Pat. No. 7,461,066.

(51) Int. Cl.
*G06F 17/30* (2006.01)
(52) U.S. Cl. .................. 707/783; 707/999.009
(58) Field of Classification Search ........... 707/999.003, 707/999.006, 999.009, 999.01, 999.2, 781–783; 709/225, 229

See application file for complete search history.

(56) References Cited

U.S. PATENT DOCUMENTS

| | | | |
|---|---|---|---|
| 5,734,887 A | 3/1998 | Kingberg et al. | |
| 5,941,947 A | 8/1999 | Brown et al. | |
| 6,253,203 B1 | 6/2001 | O'Flaherty et al. | |
| 6,370,524 B1 | 4/2002 | Witkowski | |
| 6,490,626 B1 | 12/2002 | Edwards et al. | |
| 6,553,368 B2 | 4/2003 | Martin et al. | |
| 6,581,060 B1* | 6/2003 | Choy | 707/694 |
| 6,725,227 B1 | 4/2004 | Li | |
| 6,889,231 B1 | 5/2005 | Souder et al. | |
| 6,928,431 B2 | 8/2005 | Dettinger et al. | |
| 6,954,748 B2 | 10/2005 | Dettinger et al. | |
| 6,976,023 B2* | 12/2005 | Chen et al. | 707/785 |
| 6,996,558 B2 | 2/2006 | Dettinger et al. | |
| 7,096,229 B2 | 8/2006 | Dettinger et al. | |
| 7,330,851 B2* | 2/2008 | Percival et al. | 707/634 |
| 7,461,066 B2* | 12/2008 | Dettinger et al. | 1/1 |
| 7,702,639 B2* | 4/2010 | Stanley et al. | 707/999.1 |
| 7,809,751 B2* | 10/2010 | Fuerst et al. | 707/783 |

(Continued)

OTHER PUBLICATIONS

Office Action History of U.S. Appl. No. 10/879,812 dates ranging from Dec. 29, 2006 to Jun. 27, 2008.
Office Action dated Dec. 10, 2010 for U.S. Appl. No. 12/175,321.

*Primary Examiner* — Marc R Filipczyk
(74) *Attorney, Agent, or Firm* — Patterson & Sheridan LLP

(57) ABSTRACT

A system and article of manufacture for managing access to query results and, more particularly, for managing access by multiple users to persistently stored query results, whereby at least some of the users may have different access rights. One embodiment provides a computer-readable storage medium for managing access to a query result obtained upon execution of a query against one or more databases. The computer-readable storage medium comprises creating security information configured for restricting access to the query result. The security information is associated with the query result. Access to some or all of the query result is granted to a requesting entity on the basis of the security information and an attribute of the requesting entity.

12 Claims, 6 Drawing Sheets

U.S. PATENT DOCUMENTS

| | | |
|---|---|---|
| 2002/0078068 A1 | 6/2002 | Krishnaprasad et al. |
| 2004/0088286 A1 | 5/2004 | Hackleman et al. |
| 2004/0230571 A1 | 11/2004 | Robertson et al. |
| 2005/0120203 A1 | 6/2005 | Yeh et al. |
| 2005/0289144 A1 | 12/2005 | Dettinger et al. |
| 2008/0281799 A1 | 11/2008 | Dettinger et al. |

* cited by examiner

TECHNIQUES FOR SHARING PERSISTENTLY STORED QUERY RESULTS BETWEEN MULTIPLE USERS

CROSS-REFERENCE TO RELATED APPLICATIONS

This application is a continuation of U.S. patent application Ser. No. 10/879,812, filed Jun. 29, 2004, and issued as U.S. Pat. No. 7,461,066 on Dec. 2, 2008, which is herein incorporated by reference in its entirety.

BACKGROUND OF THE INVENTION

1. Field of the Invention

The present invention generally relates to query processing and, more particularly, to managing access by multiple users to persistently stored query results.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, a DBMS can be structured to support a variety of different types of operations. Such operations can be configured to retrieve, add, modify and delete information being stored and managed by the DBMS. Standard database access methods support these operations using high-level query languages, such as the Structured Query Language (SQL). The term "query" denominates a set of commands that cause execution of operations for processing data from a stored database. For instance, SQL supports four types of query operations, i.e., SELECT, INSERT, UPDATE and DELETE. A SELECT operation retrieves data from a database, an INSERT operation adds new data to a database, an UPDATE operation modifies data in a database and a DELETE operation removes data from a database.

Any requesting entity, including applications, operating systems and, at the highest level, users, can issue queries against data in one or more databases. Queries may be predefined (i.e., hard coded as part of an application) or may be generated in response to input (e.g., user input). A given requesting entity may execute a multiplicity of different queries. Upon execution of each query against one or more databases, a corresponding query result is returned to the requesting entity. Any executed query and corresponding query result(s) can be stored persistently.

A typical approach for managing query results involves RowSet-like technologies. More specifically, a RowSet is an instance of a Java® RowSet class which in turn is part of a RowSet framework which has been created on the basis of the Java® programming language. The RowSet framework provides others the ability to query one or more databases for obtaining a series of database rows forming a query result, i.e., a rowset. The rowset can be detached from the one or more databases and stored as a persistent data object. Thus, the rowset can be accessed and modified as required independent of the one or more databases. Subsequently, the modified rowset and the one or more databases can be synchronized to reflect the modifications performed on the rowset in the one or more databases. A given rowset can be provided to a plurality of users which can, thus, share data contained in the rowset.

However, one problem when dealing with rowsets is that, conventionally, a rowset can only be shared by different users having identical access rights. In other words, if two different users have distinct security settings, they cannot share a given rowset as the access rights of at least one of the users may not authorize this user(s) to access one or more portions of the given rowset. For instance, assume a rowset which contains data about a given research activity in a company. This rowset is accessible by researchers in the company. Assume now that at least one portion of the data contained in the rowset is useful to project managers of the company. However, as project managers and researchers generally have differing access rights, the project managers would not be able to access the at least one portion of the data in the rowset.

Therefore, there is a need for an efficient and more flexible technique for sharing persistently stored query results between multiple users, whereby at least some of the users may have different access rights.

SUMMARY OF THE INVENTION

The present invention is generally directed to a method, system and article of manufacture for managing access to query results and, more particularly, for managing access by multiple users to persistently stored query results, whereby at least some of the users may have different access rights.

One embodiment provides a method of managing access to a query result obtained upon execution of a query against one or more databases. The method comprises creating security information configured for restricting access to the query result. The security information is associated with the query result. Access to some or all of the query result is granted to a requesting entity on the basis of the security information and an attribute of the requesting entity.

Another embodiment provides a method of managing access by multiple users to a limited subset of data stored in one or more databases. The method comprises executing a query against the one or more databases to obtain the subset of data, and attaching security information to the subset of data. The method further comprises allowing access to the subset of data by the multiple users, whereby the access by a particular user is dependent on one or more attributes of the particular user and the security information attached to the subset of data.

Still another embodiment provides a computer-readable medium containing a program which, when executed by a processor, performs a process for managing access to a query result obtained upon execution of a query against one or more databases. The process comprises creating security information configured for restricting access to the query result. The security information is associated with the query result. Access to a requesting entity to some or all of the query result is granted on the basis of the security information and an attribute of the requesting entity.

Still another embodiment provides a computer-readable medium containing a program which, when executed by a processor, performs a process of managing access by multiple users to a limited subset of data stored in one or more databases. The process comprises executing a query against the one or more databases to obtain the subset of data, and attaching security information to the subset of data. The process further comprises allowing access to the subset of data by the multiple users, whereby the access by a particular user is dependent on one or more attributes of the particular user and the security information attached to the subset of data.

Still another embodiment provides a system comprising one or more databases, a query result obtained upon execution of a query against the one or more databases, security information configured for restricting access to the query result, and a query manager. The query manager is configured for granting access to a requesting entity to some or all of the query result on the basis of the security information and an attribute of the requesting entity.

Still another embodiment provides a system comprising one or more databases having data, and a query manager. The query manager is configured for executing a query against the one or more databases to obtain a subset of the data. The security information is attached to the subset of the data. The query manager is further configured for allowing access to the subset of the data by multiple users, whereby the access by a particular user is dependent on one or more attributes of the particular user and the security information attached to the subset of the data.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS INTRODUCTION

Figure 1A:
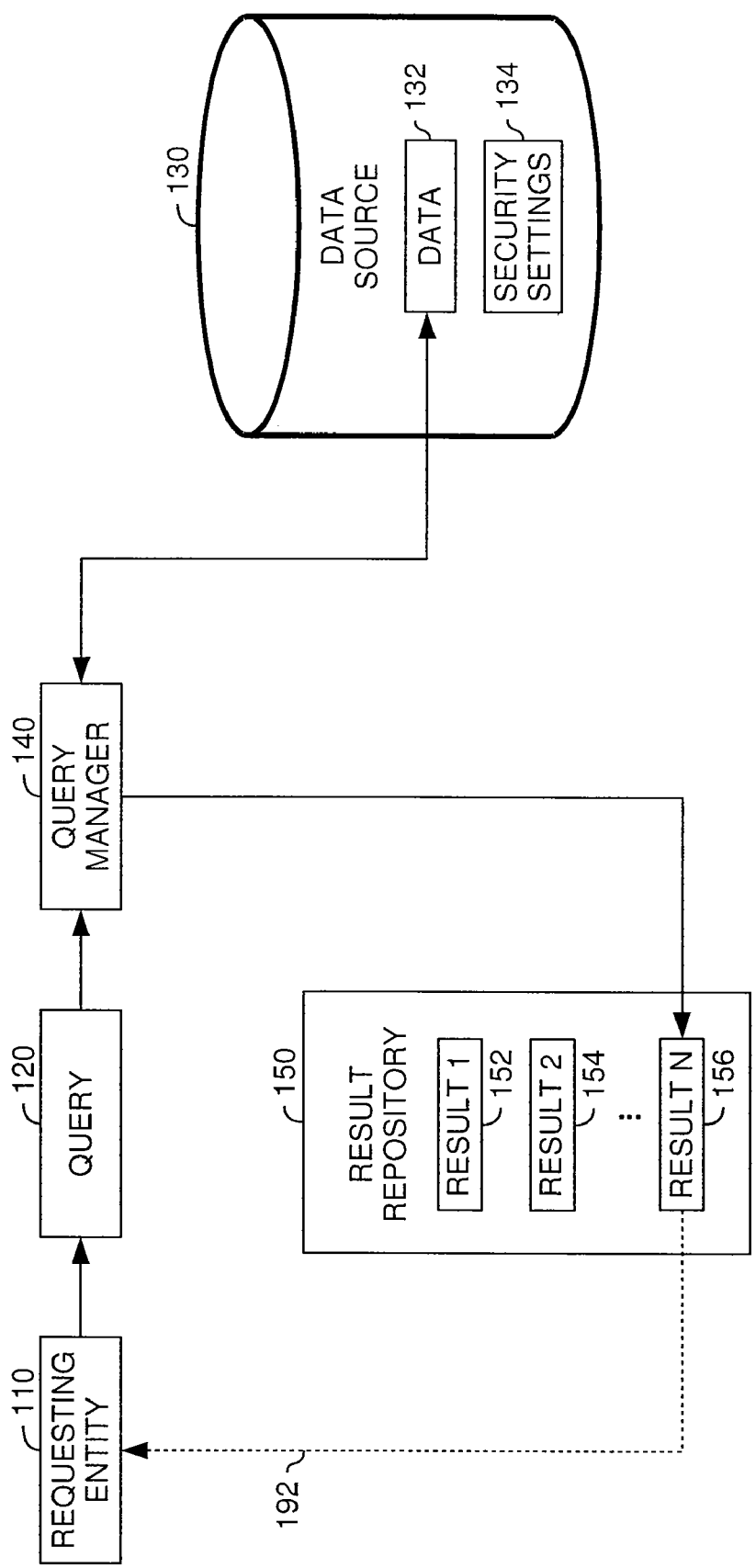
FIG. 1A is a relational view of software components for creation of query results in one embodiment.

The present invention is generally directed to a method, system and article of manufacture for managing access to query results and, more particularly, for managing access by multiple users to persistently stored query results. According to one aspect, at least some of the users have different access rights for the persistently stored query results.

In one embodiment, access to a query result obtained upon execution of a query against one or more databases is managed. In order to restrict access to the query result, corresponding security information is created for the query result. The security information is associated with the query result. Thus, access to some or all of the query result can be granted to a requesting entity on the basis of the security information and an attribute of the requesting entity. Accordingly, access to some or all of the query result is restricted to access by authorized requesting entities.

In another embodiment, access by multiple users to a limited subset of data stored in one or more databases is managed. According to one aspect, the subset of data can be obtained by executing a query against the one or more databases. Access to the subset of data by the multiple users is allowed. However, in order to manage the access to the subset of data, security information is attached to the subset of data. Thus, the access to the subset of data by a particular user can be made dependent on one or more attributes of the particular user and the security information attached to the subset of data.

DATA PROCESSING ENVIRONMENT

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Embodiments of the invention can be implemented in a hardware/software configuration including at least one networked client computer and at least one server computer. Furthermore, embodiments of the present invention can apply to any comparable hardware configuration, regardless of whether the computer systems are complicated, multi-user computing apparatus, single-user workstations, or network appliances that do not have non-volatile storage of their own. Further, it is understood that while reference may be made to particular query languages, including SQL, the invention is not limited to a particular language, standard or version. Accordingly, persons skilled in the art will recognize that the invention is adaptable to other query languages and that the invention is also adaptable to future changes in a particular query language as well as to other query languages presently unknown. Moreover, it is understood that while reference may be made to implementations on the basis of RowSet-like technologies, the invention is not limited to such technologies and can be applied to any subset or collection of data from a data source, including rowsets.

PREFERRED EMBODIMENTS

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Referring now to FIG. 1A, a relational view of software components in one embodiment is illustrated. According to one aspect, the software components are configured for obtaining a subset of data from a data source. By way of example, reference is made to obtaining the subset of data by issuing a query against a data source, whereby the obtained subset of data is returned as query result. However, it should be noted that any suitable technique for obtaining the subset of data and any suitable subset of data is broadly contemplated.

Illustratively, the software components include a requesting entity 110 and a query manager 140. According to one aspect, the requesting entity 110 issues queries, such as query 120, against data 132 of a data source 130. By way of example, the requesting entity 110 can be embodied by any application, an operating system or, at the highest level, users. The queries issued by the requesting entity 110 may be predefined (i.e., hard coded as part of an application) or may be generated in response to input (e.g., user input).

In one embodiment, the query 120 is an SQL query. One of the most common executed SQL queries is the SELECT statement. The SELECT statement generally has the format: "SELECT<clause>FROM<clause>WHERE<clause>GROUP BY<clause>HAVING<clause>ORDER BY<clause>". The clauses must generally follow this sequence. Only the SELECT and FROM clauses are required and all other clauses are optional. The result of a SELECT statement is, in general, a subset of data retrieved from one or more existing tables (e.g., data 132) stored in a relational database (e.g., data source 130 of FIG. 1), wherein the FROM clause identifies the name of the table or tables from which the data is being selected. The subset of data is treated as a new table, termed the result table. The WHERE clause determines which rows should be returned in the result table. Generally, the WHERE clause contains one or more query conditions that must be satisfied by each row returned in the result table. The query condition(s) are typically one or more predicates, each of which specifies a comparison between two values from certain columns, constants or correlated values using suitable comparison operators, such as "=", ">" and "<". Multiple predicates in the WHERE clause are typically connected by Boolean operators, such as Boolean AND and/or OR operators.

In another embodiment, the query 120 is an abstract query. An abstract query is composed using logical fields defined by a data abstraction model. Each logical field is mapped to one or more physical entities of data of an underlying data representation being used in the data source 130 (e.g., XML, SQL, or other type representation). Furthermore, in the data abstraction model the logical fields are defined independently from the underlying data representation, thereby allowing queries to be formed that are loosely coupled to the underlying data representation. The abstract query can be configured to access the data 132 and return query results, or to modify (i.e., insert, delete or update) the data 132. For execution against the data 132, the abstract query is transformed into a form (referred to herein as concrete query) consistent with the underlying data representation of the data 132. Transformation of abstract queries into concrete queries is described in detail in the commonly owned, co-pending U.S. patent application Ser. No. 10/083,075, entitled "Application Portability And Extensibility Through Database Schema And Query Abstraction," filed Feb. 26, 2002, which is incorporated by reference in its entirety.

The data source 130 is representative of any collection of data regardless of the particular physical representation. In one embodiment, the data source 130 includes one or more databases. Each of the one or more databases may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

The query manager 140 executes the query 120 against the data 132 of the data source 130 to obtain a query result. Illustratively, upon execution of the query 120, the query manager 140 obtains a query result 156 from the data source 130. As illustrated by dashed arrow 192, the query result 156 may subsequently be presented to the requesting entity 110.

The query manager 140 stores the query result 156 as a persistent data object in a result repository 150. Illustratively, the result repository 150 already includes a multiplicity of query results 152, 154 (only two are shown, for brevity) which are also stored as persistent data objects. However, it should be noted that providing the result repository 150 with the obtained query results 152, 154 and 156 is merely illustrative and not intended for limiting the invention accordingly. For instance, the obtained query results 152, 154 and 156 may be obtained by different requesting entities and stored individually at different locations in a corresponding data processing system.

In one embodiment, access to the query results 152, 154 and 156 is restricted on the basis of security settings 134. Illustratively, the security settings 134 are stored in the data source 130. By way of example, access to a given query result can be restricted by modifying a subsequently received query from another requesting entity to remove one or more results fields from the query based on security information attached to the given query result and one or more attributes of the other requesting entity. Access to the given query result can further be restricted by presenting the other requesting entity with only a limited portion of data of the given query result based on the security information attached to the given query result and one or more attributes of the other requesting entity. Operation of the query manager 140 for restricting access to the query results 152, 154 and 156 is explained in more detail below with reference to FIGS. 1B-C.

Figure 1B:
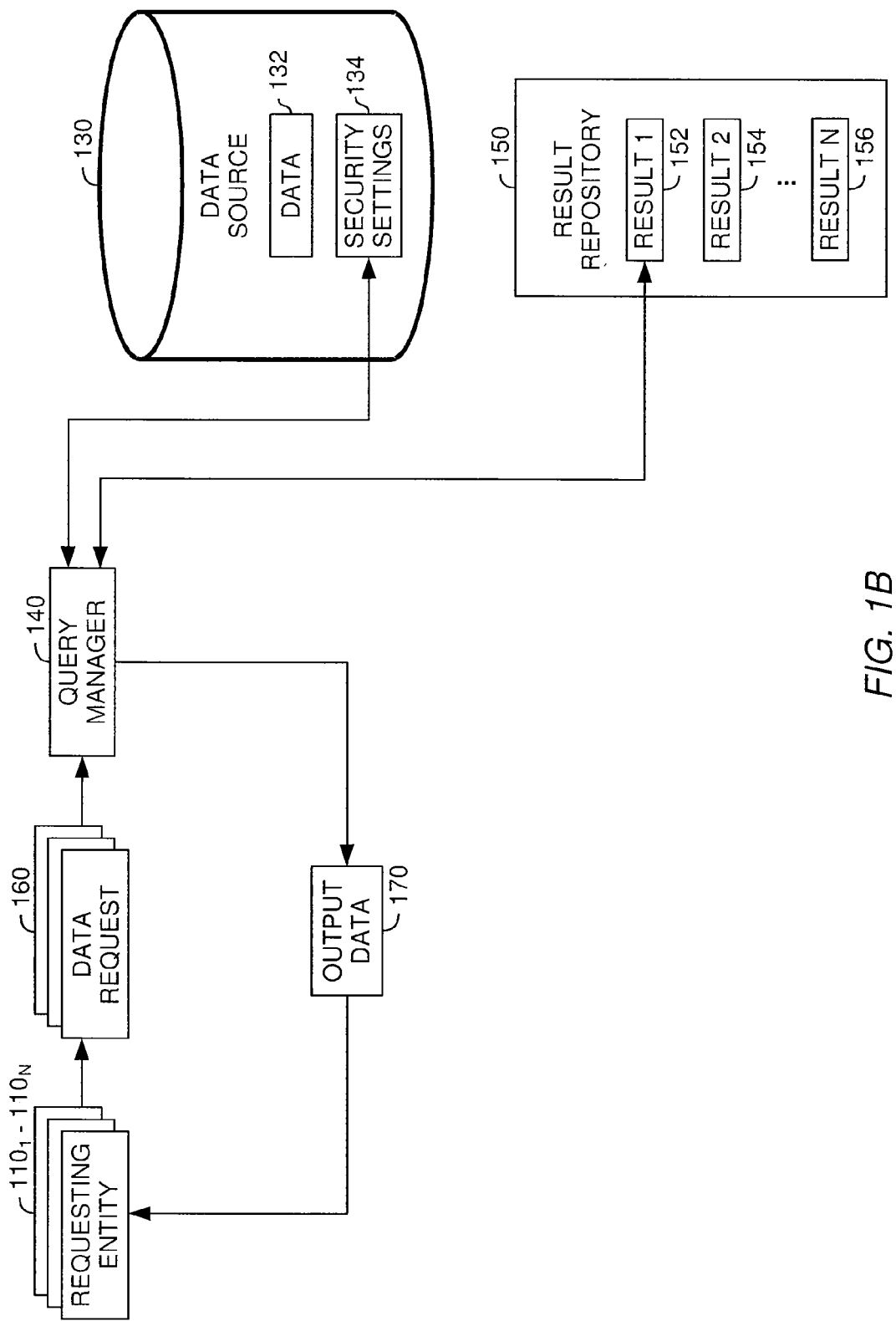
FIG. 1B is a relational view of the software components of FIG. 1A for managing access to query results in one embodiment.

FIG. 1B shows a relational view of the software components of FIG. 1A in an embodiment for managing access to the query results 152, 154 and 156. Illustratively, a plurality of requesting entities $110_1$-$110_N$ issues data requests 160 against the query results 152, 154, and 156. In one embodiment, each of the query results 152, 154 and 156 is stored as a rowset which has been defined using an instance of a Java® RowSet class.

According to one aspect, a given data request can be embodied as a particular query (e.g., query 120 of FIG. 1A) issued against the data 132 of the data source 130. In this case, the query manager 140 can be configured for determining whether the particular query has previously been executed against the data 132. Thus, if the particular query has been executed previously, the query manager 140 can retrieve a corresponding query result from the result repository 150, which has been obtained in the previous execution of the particular query, instead of re-executing the particular query assuming the underlying database has not changed in a manner that would affect the query result.

By way of example, assume that one of the requesting entities $110_1$-$110_N$ (hereinafter referred to as "requesting entity 110") issues one of the data requests 160 (hereinafter referred to as "data request 160") against the query result 152. The query manager 140 receives the data request 160 and determines whether the requesting entity 110 is authorized to access all or at least some of the query result 152. To this end, the query manager 140 determines one or more attributes from the requesting entity 110. The determined attribute(s) is suitable to identify the requesting entity 110. By way of example, the determined attribute(s) can be an entity name, an entity identifier, a role of the requesting entity or an authorization level. According to one aspect, the requesting entity 110 is a user. Accordingly, the determined attribute(s) can be a user name, a user identifier, a role of the user or an authorization level associated with the user.

The query manager 140 further accesses the security settings 134 in the data source 130 for determining access rights for the requesting entity 110. In one embodiment, the security settings 134 are suitable for identifying access rights for a plurality of potential requesting entities, including the requesting entities $110_1$-$110_N$, to components of a given data processing system, such as the data source 130 and/or the result repository 150. Accordingly, using the security settings 134, access to these components can be restricted to access by authorized requesting entities.

For instance, the security settings 134 can be implemented in order to define for each portion of the data 132 which requesting entity of the requesting entities $110_1$-$110_N$ is allowed to access that portion of the data 132. Furthermore, the security settings 134 may be provided with a user or application-specific granularity. For instance, the security settings 134 can be configured for restricting access to entire database tables, columns or rows of the database tables. Accordingly, different scenarios may occur in which different access rights to the query result 152 are determined for different requesting entities based on the security settings 134 and the attributes. In other words, while all these requesting entities are operating on the same query result, i.e., query result 152, different data can be presented to each of these requesting entities. By way of example, a first portion of the query result 152 may be presented to a first requesting entity and a second portion of the query result 152 may be presented to a second requesting entity, whereby the first portion contains one or more data objects not presented in the second portion. Exemplary scenarios in which different requesting entities illustratively represented by users attempt to access a single query result provided in the form of a rowset are described below with reference to Tables I-IV:

TABLE I

EXEMPLARY SCENARIO 1

| | |
|---|---|
| 001 | User A executes query: "Select * from table-x" |
| 002 | User A can access all rows from query result |
| 003 | User B can only access even rows from the query result |

As can be seen from Table I, User A executes a query against a database table "table-x" to create a rowset containing all rows of the database table "table-x" (line 001). According to line 002, the security settings 134 are defined such that when User A connects to the rowset, each call to a NEXT function goes to the next row of the rowset, as User A is allowed to access all rows thereof. However, when User B connects to the rowset, each call to the NEXT function continues calling the NEXT function according to line 003 until an allowed row is reached, i.e., an even row of the rowset.

TABLE II

EXEMPLARY SCENARIO 2

| | |
|---|---|
| 001 | User A executes query: "Select * from table-x, table-y" |
| 002 | User A can access all rows from query result |
| 003 | User B can only access a single row from table-x |

As can be seen from Table II, User A executes a query against database tables "table-x" and "table-y" to create a rowset containing all rows of these database tables (line 001). According to line 002, the security settings 134 are defined such that when User A connects to the rowset, each call to a NEXT function goes to the next row of the rowset. However, when User B connects to the rowset, each call to the NEXT function continues calling the NEXT function according to line 003 until the single row from "table-x" in the rowset is reached.

TABLE III

EXEMPLARY SCENARIO 3

| | |
|---|---|
| 001 | User A executes query: "Select * from table-x, table-y" |
| 002 | User A can access a first set of rows from query result |
| 003 | User B can access a different, second set of rows from the query result |

As can be seen from Table II, User A executes a query against the database tables "table-x" and "table-y" to create a rowset containing all rows of these database tables (line 001). According to line 002, the security settings 134 are defined such that when User A connects to the rowset, only rows contained in the first set of rows from the rowset are presented to User A. Similarly, when User B connects to the rowset, only rows contained in the second set of rows from the rowset are presented to User B._In other words, all rows contained in the first set of rows from the rowset are hidden to User B.

TABLE IV

EXEMPLARY SCENARIO 4

| | |
|---|---|
| 001 | User A executes query: "Select * from table-x, table-y" |
| 002 | User A can access all rows from query result |
| 003 | User B can access all rows from table-x and table-y |
| 004 | User C can only access a single row from the query result |
| 005 | User B is not authorized to access the query result |

As can be seen from Table IV, User A executes a query against the database tables "table-x" and "table-y" to create a rowset containing all rows of these database tables (line 001). According to line 002, the security settings 134 are defined such that when User A connects to the rowset, each call to a NEXT function goes to the next row of the rowset. When User C connects to the rowset, each call to the NEXT function continues calling the NEXT function according to line 004 until the single row from the rowset is reached. However, while User B is authorized to access all rows from "table-x" and "table-y" (line 003), User B is not authorized to access the rowset (line 005). Accordingly, if User B attempts to connect to the rowset, access is denied by the query manager 140 on the basis of the security settings 134.

Assume now that in the example illustrated in FIG. 1B the access rights determined on the basis of the security settings 134 define that the requesting entity 110 is authorized to access only one or more portions of the query result 152, but not the entire query result 152. Accordingly, on the basis of the determined access rights, the query manager 140 identifies the one or more portions from the query result 152 as output data 170. The query manager 140 then presents the output data 170 to the requesting entity 110.

Figure 1C:
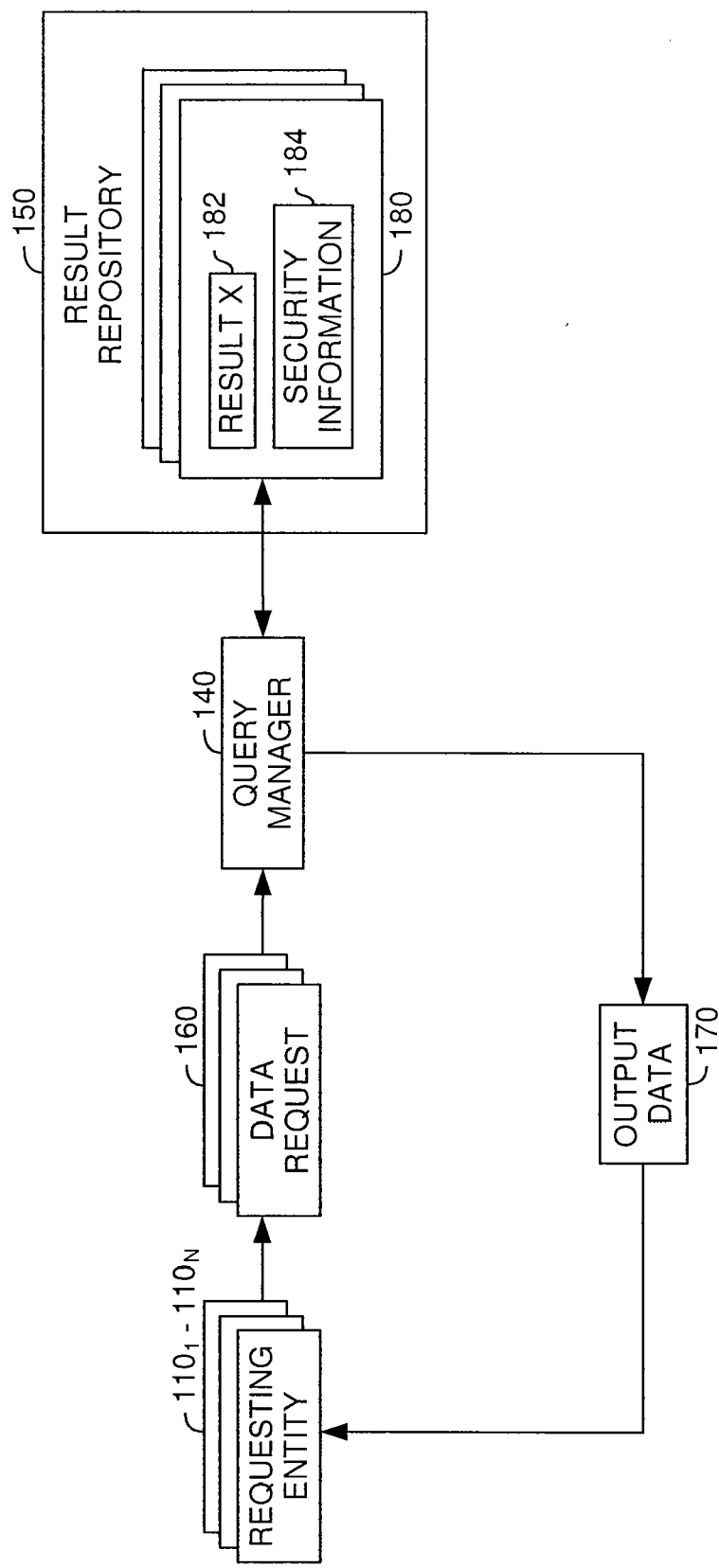
FIG. 1C is a relational view of the software components of FIG. 1A for managing access to query results in another embodiment.

Referring now to FIG. 1C, a relational view of the software components of FIG. 1A in another embodiment for managing access to the query results 152, 154 and 156 is shown. Illustratively, a plurality of requesting entities 110₁-110_N issues data requests 160 against a plurality of query results 180, which are stored as persistent data objects in the result repository 150. Each query result 180 includes result data 182 and associated security information 184. According to one aspect, the result data 182 corresponds to data of a query result (e.g., one of query results 152-156 of FIG. 1A) obtained upon execution of a query (e.g., query 120 of FIG. 1A) against a data source (e.g., data source 130 of FIG. 1A). In one embodiment, the result data 182 is defined using an instance of a Java® RowSet class. The query result 180 can be defined using an instance of an extension to the Java® RowSet class.

Assume now, by way of example, that the query manager 140 receives a given data request from the data requests 160 (hereinafter referred to as "data request 160") from a user against a given query result 180 from the query results 180 (hereinafter referred to as "query result 180"). Upon receipt of the data request 160, the query manager 140 determines whether the user is authorized to access all or at least some of the result data 182 of the query result 180. To this end, the query manager 140 determines attributes from the user as described above with reference to FIG. 1B, for example. The query manager 140 further determines access rights for the user with respect to the result data 182. The access rights for the user are determined on the basis of the security information 184.

In one embodiment, the security information 184 is created on the basis of the security settings 134 of FIG. 1A. Accordingly, the security information 184 may include security settings for a plurality of potential users of the result data 182. Thus, the security information 184 is suitable for defining access rights for each potential user to some or all of the result data 182. Alternatively, the security information 184 may define a link to the security settings 134. In this case, the security settings 134 are used for defining the access rights of the potential users. Specifically, in the example illustrated in FIG. 1C, the query manager 140 determines access rights for the user on the basis of the security information 184. Using the determined access rights, the query manager 140 identifies portions from the result data 182 to which access by the user is allowed. The query manager 140 then presents the identified portions as output data 170 to the user. Operation of the query manager 140 is described in more detail below with reference to FIG. 2.

Figure 2:
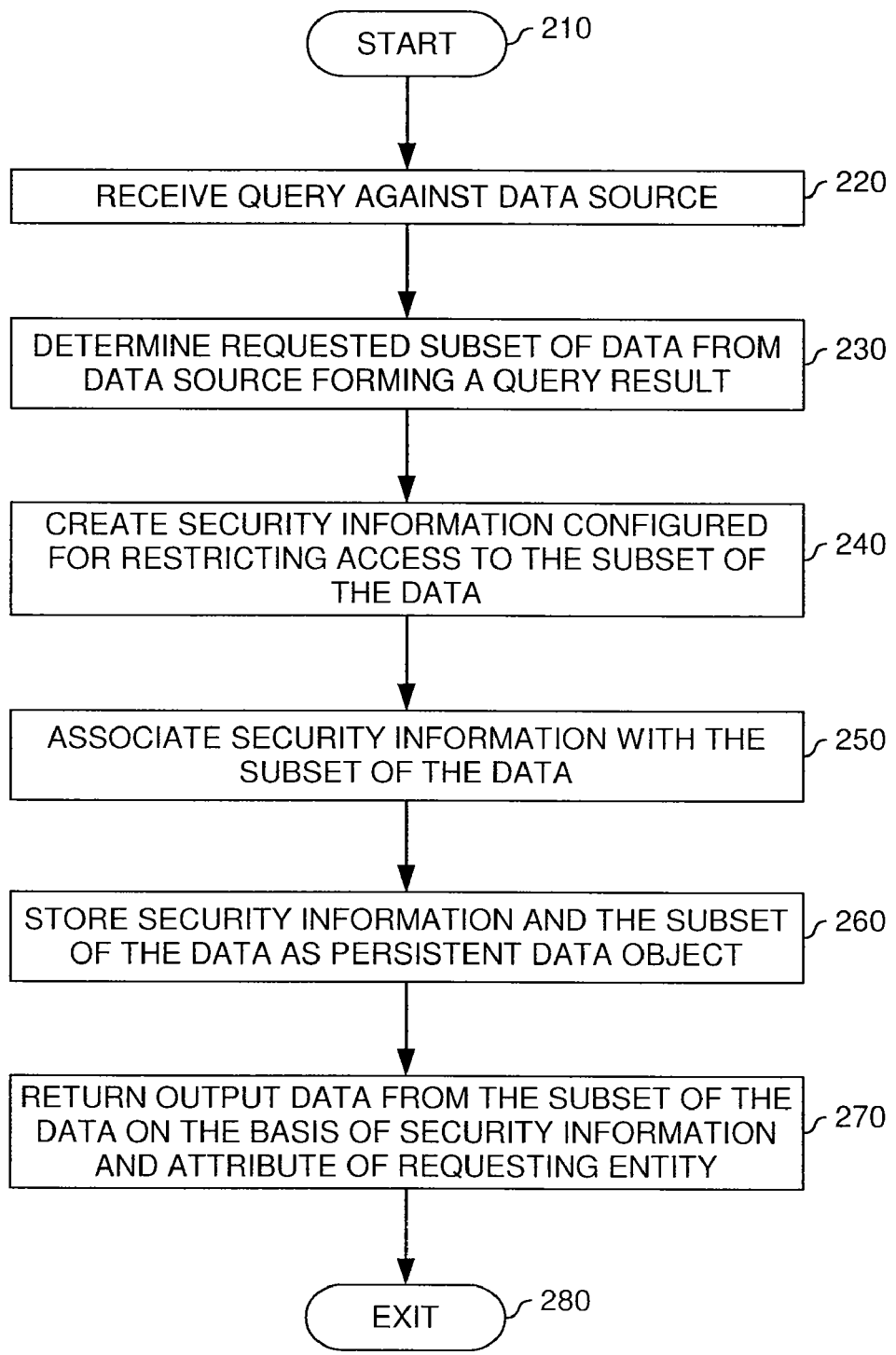
FIG. 2 is a flow chart illustrating a method for managing access to data of a data source in one embodiment.

Referring now to FIG. 2, one embodiment of a method 200 for managing access by multiple users to a limited subset of data stored in one or more databases (e.g., data 132 of data source 130 of FIG. 1A) is shown. According to one aspect, the limited subset of the data defines a query result (e.g., one of query results 152, 154, 156 of FIG. 1B or result data 182 of FIG. 1C). At least part of the steps of method 200 can be performed using a query manager (e.g., query manager 140 of FIG. 1A). Method 200 starts at step 210.

At step 220, a query (e.g., query 120 of FIG. 1A) from a requesting entity (e.g., requesting entity 110 of FIG. 1A) against a data source (e.g., data source 130 of FIG. 1A) is received. At step 230, the query is executed. In response to execution of the query, a limited subset of data defining a query result (e.g., query result 156 of FIG. 1A) is obtained.

At step 240, security information is created. The security information is configured for restricting access to the limited subset of data. In one embodiment, creating the security information includes creating security settings. According to one aspect, the security information (e.g., security information 184 of FIG. 1C) may include the security settings. Alternatively, the security information may define a link to the security settings. According to another aspect, the query manager may link the query result with the security settings (e.g., security settings 134 of FIG. 1B).

At step 250, the security information is associated with the limited subset of data. At step 260, the security information is stored together with the limited subset of data as a persistent data object (e.g., query result 180 of FIG. 1C). The persistent data object can be defined using an instance of an extension to the Java® RowSet class. Alternatively, the limited subset of data can be stored as a persistent data object (e.g., query result 152 of FIG. 1B) and the security settings are stored, for instance, in the data source (e.g., data source 130 of FIG. 1B). In this case, the persistent data object can be defined using an instance of the Java® RowSet class.

At step 270, one or more attributes of the requesting entity are determined, such as an entity name, an entity identifier, a role of the requesting entity or an authorization level. Then, on the basis of the determined attribute(s) and the security information, the extent to which the requesting entity is allowed to access the persistent data object is determined. According to the determined extent, data from the persistent data object is identified is allowed to be presented to the requesting entity. The determined data is presented as output data (e.g., output data 170 of FIGS. 1B-C) to the requesting entity. Method 200 then exits at step 280.

It should be noted that the persistent data object that has been stored at step 260 of method 200 can subsequently be accessed by multiple requesting entities on the basis of the security information and one or more attribute(s) of the requesting entities attempting to access the persistent data object. An exemplary method 300 illustrating access to the persistent data object by some requesting entity X is described below with reference to FIG. 3. At least part of the steps of method 300 can be performed using a query manager (e.g., query manager 140 of FIGS. 1B-C).

Method 300 starts at step 310. At step 320, a data request (e.g., data request 160 of FIGS. 1B-C) is received from the requesting entity X (e.g., requesting entity 110 of FIGS. 1B-C). The received data request is a request to access a limited subset of data, such as a query result, which has been stored as a persistent data object (e.g., query result 152 of FIG. 1B or query result 180 of FIG. 1C).

At step 330, access to at least one or more portions of the persistent data object is granted or denied. An exemplary method of granting access to a persistent data object is described below with reference to FIG. 4. The at least one or more portions, to which access is granted, are then presented to the requesting entity as output data (e.g., output data 170 of FIGS. 1B-C).

At step 340, the requesting entity X processes the output data as required. For instance, the requesting entity X may display or print the output data. Furthermore, the requesting entity X may modify the output data. By way of example, if the output data is presented in tabular form having a plurality of rows and columns, the requesting entity X may insert, update or delete rows and/or columns from the output data. If the requesting entity X modifies the output data, the persistent data object is accordingly modified. However, in this case the persistent data object and corresponding data in the underlying data source (e.g., data source 130 of FIG. 1A) may differ. Therefore, at step 350, it is determined whether the persistent data object has been changed by the requesting entity X at step 340.

If the persistent data object has not been changed, method 300 exits at step 370. If, however, it is determined at step 350 that the persistent data object has been changed by modifications of the output data, then at step 360, the underlying data source is synchronized. In other words, at step 360, if the persistent data object has been changed, the corresponding data in the underlying data source is changed accordingly. Method 300 then exits at step 370.

However, it should be noted that synchronizing the underlying data source is merely optional. Furthermore, synchronization and/or a degree of synchronization can be application-specific or defined by an administrator of the underlying data source. For instance, it can be defined that the underlying data source is synchronized in response to modifications which are performed by specific users, but that modifications of other users are not taken into consideration. Furthermore, it can be defined that modifications on specific portions of the persistent data object require synchronization, while modifications on other portions are not considered. Moreover, it can be defined that no synchronization at all should be performed. In other words, synchronization of the underlying data source can be handled in various different ways which are all broadly contemplated.

Figure 3:
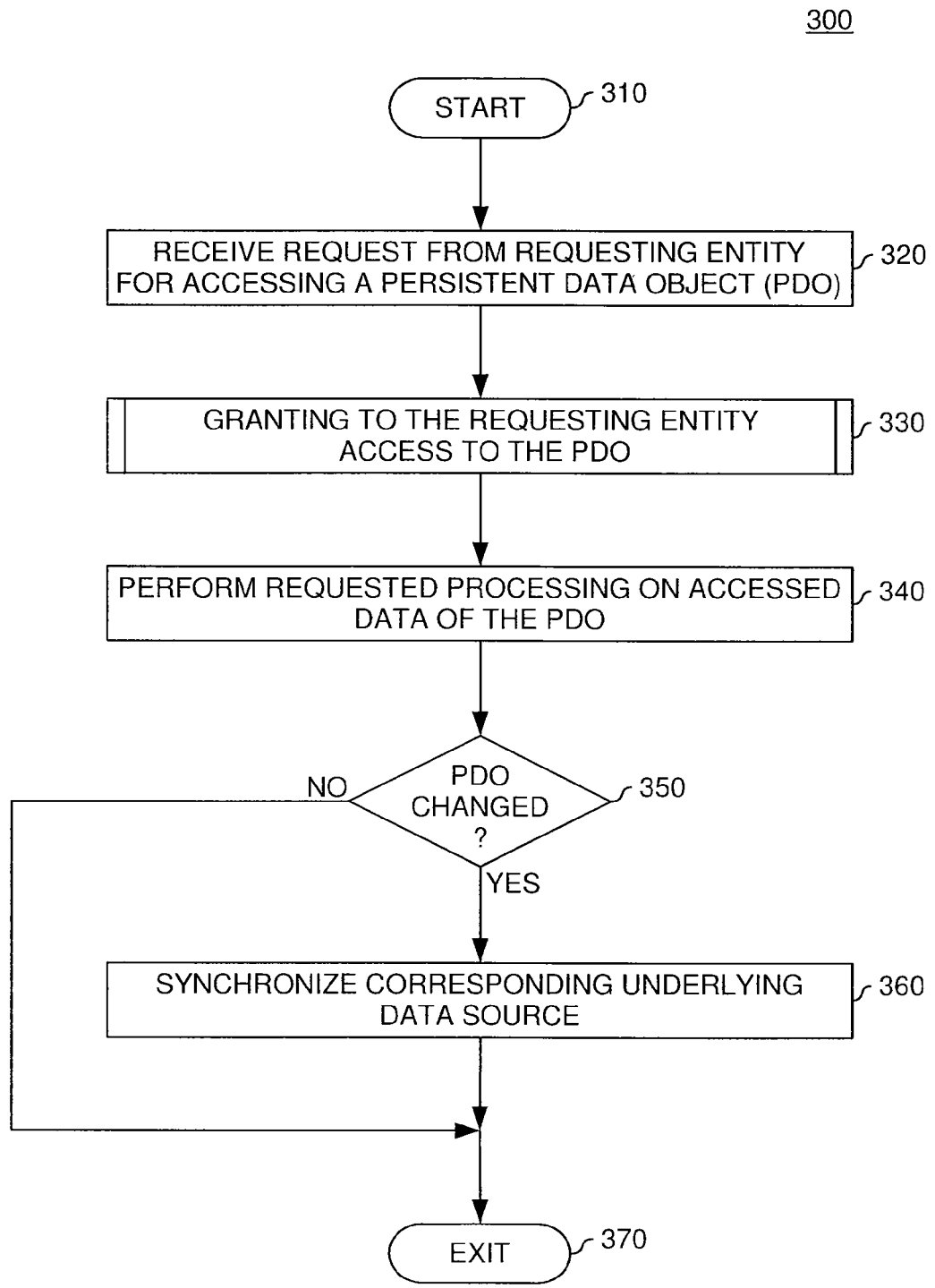
FIGS. 3-4 are flow charts illustrating a method for managing access to a query result in one embodiment.
Figure 4:
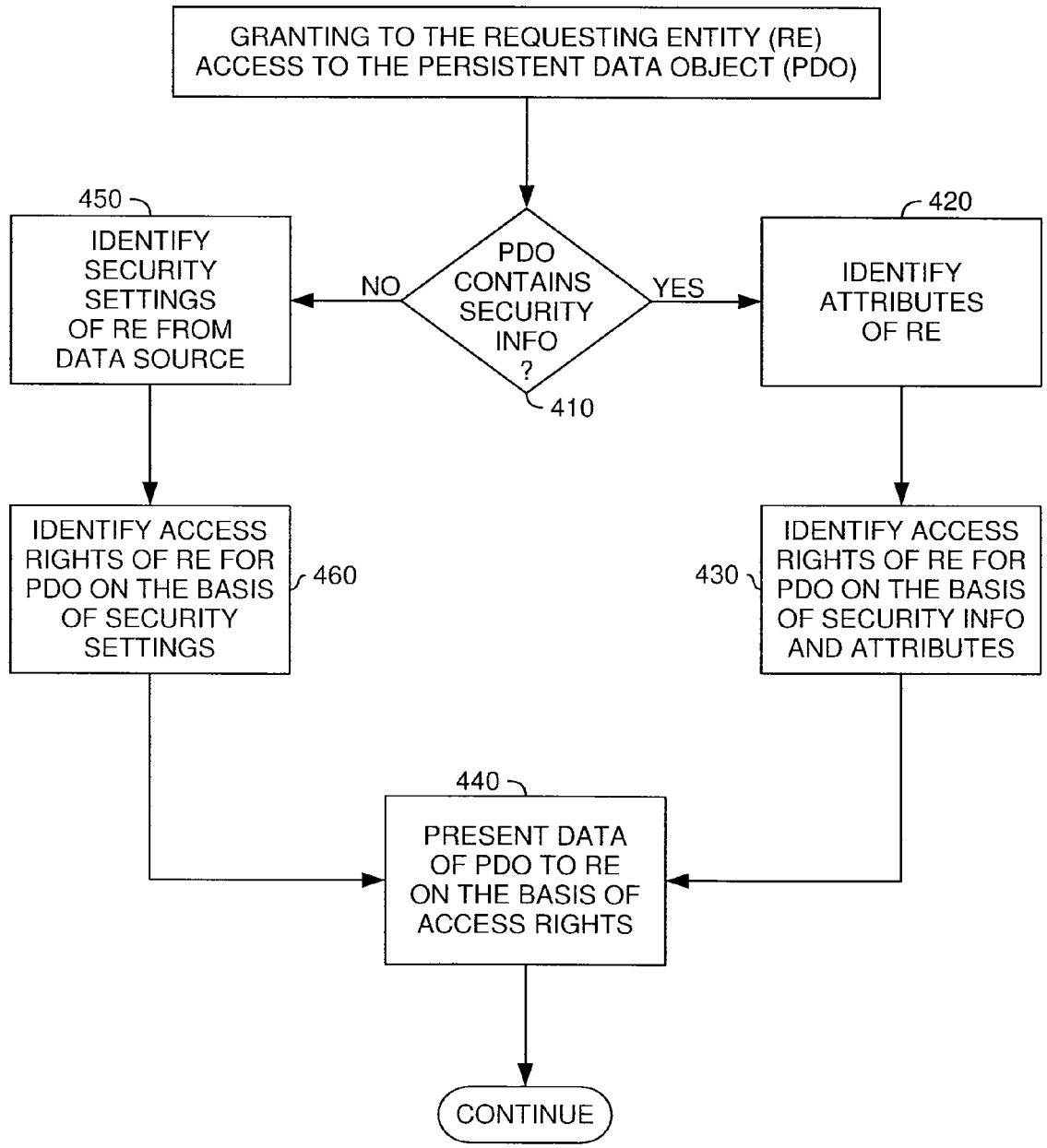

Referring now to FIG. 4, an exemplary method 400 of granting access to a persistent data object (e.g., query result 152 of FIG. 1B or query result 180 of FIG. 1C) according to step 330 of FIG. 3 is shown. At least part of the steps of method 400 can be performed using a query manager (e.g., query manager 140 of FIGS. 1B-C). Method 400 starts at step 410, where it is determined whether the persistent data object includes security information (e.g., security information 184 of FIG. 1C).

If security information is included with the persistent data object (e.g., query result 180 of FIG. 1C), one or more attributes of the requesting entity are determined at step 420. Then, at step 430, access rights to the persistent data object are identified for the requesting entity on the basis of the security information and the determined attribute(s). Accordingly, at step 440 nothing, one or more portions, or the entire persistent data object is presented as output data to the requesting entity on the basis of the identified access rights. Processing then continues at step 340 of FIG. 3.

If, however, it is determined at step 410 that security information is not included with the persistent data object (e.g., query result 160 of FIG. 1B), security settings (e.g., security settings 134 of FIG. 1B) for the requesting entity are determined, at step 450. Then, at step 460, access rights to the persistent data object are identified for the requesting entity on the basis of the security settings. Processing then continues at step 440.

In various embodiments, the invention provides numerous advantages over the prior art. For instance, in one embodiment reuse of query results is improved by attaching security information thereto. Accordingly, the query results can be used more broadly, making it possible to achieve more efficient utilization of databases in query execution, especially if the query result is stored as a persistent data object which can be offloaded to various servers for use, for example, in a business tier of an n-tier architecture application. Thus, the persistent data objects can be made available to users even when a given main server, which stores the underlying database(s), is offline.

Furthermore, in one embodiment existing standards work going on for RowSet-type data access can be leveraged. For instance, according to one aspect a user may create an instance of an extension to the Java® RowSet class (hereinafter referred to as a "SecurityEnabledRowSet") similar to creating an instance of the Java® RowSet class. By way of example, the user may construct the SecurityEnabledRowSet from a ResultSet or another RowSet object, which thus contains a limited subset of data. The SecurityEnabledRowSet encrypts its limited subset of data upon creation. Furthermore, the SecurityEnabledRowSet provides connect methods which allow users to establish a connection to it in a manner which can be similar to a connection to a database. A user connected to a SecurityEnabledRowSet can then access the limited subset of data in the same way that a normal RowSet or ResultSet is accessed. However, retrieval of rows and data cells is governed by the security settings of the users being applied to the limited subset of data.

According to one aspect, a SecurityEnabledRowSet can be created with a user list which is configured to limit a number of different users of the SecurityEnabledRowSet to users, for which security information has been collected. Accordingly, the size of the SecurityEnabledRowSet can be minimized, make the SecurityEnabledRowSet less complex. Further, the SecurityEnabledRowSet serves as an automatic access list for the use of the SecurityEnabledRowSet which has value in and of itself.

According to another aspect, the SecurityEnabledRowSet can be created in a deferred security mode. In this mode, the security information is not initially stored for all users, but is instead retrieved from the underlying database(s) via a remote call when a user connects to the rowset. In this model, the rowset may inform the database(s) of what data it has available. Then, the database(s) may provide some map defining, for instance, which rows are available for access by the connecting user. This is beneficial as it may limit the security information retrieved from the database(s). It is also beneficial in that it allows a late binding of security information to the rowset ensuring that if a user's access rights change after the rowset is created, the changed access rights will be taken into consideration.

While the foregoing is directed to embodiments of the present invention, other and further embodiments of the invention may be devised without departing from the basic scope thereof, and the scope thereof is determined by the claims that follow.

What is claimed is:

1. A computer-readable storage medium containing a program which, when executed by a processor, performs a process for managing access to query results, the process comprising:

generating a plurality of persistent data objects, wherein generating comprises, for each persistent data object:

receiving a query result comprising a dataset obtained from one or more databases in response to execution of a query against the one or more databases;

creating security information, wherein the security information is configured for restricting access to the query result;

associating the security information with the query result, wherein the security information includes security settings for a plurality of potential requesting entities, the security settings defining access rights of each potential requesting entity to some or all of the query result; and storing the query result with the associated security information in the respective persistent data object; whereby each of the persistent data objects is detached from the one or more databases from which the respective query result was obtained so that the persistent data objects are independently accessible on the basis of the respective security information contained within the respective persistent data object;

receiving, from a plurality of requesting entities, access requests to the plurality of persistent data objects; and for each request:

granting access to a given requesting entity to at least a portion of a query result of a given persistent data object on the basis of the respective associated security information and an attribute of the given requesting entity; and if access cannot be granted on the basis of the respective associated security information and the attribute, initiating a late binding of external security information to the given persistent data object, wherein the external security information is retrieved from a data source external to the given persistent data object.

2. The computer-readable medium of claim 1, wherein the given requesting entity is a user and the attribute of the requesting entity is one of:
(i) a user name;
(ii) a role of the user; and
(iii) an authorization level of the user.

3. The computer-readable medium of claim 1, wherein the process further comprises:
receiving a first request for accessing the query result from a first requesting entity;
presenting a first portion of the query result to the first requesting entity on the basis of the security information and the attribute of the first requesting entity;
receiving a second request for accessing the query result from a second requesting entity; and
presenting a second portion of the query result to the second requesting entity on the basis of the security information and the attribute of the second requesting entity, wherein the first portion contains one or more data objects not presented in the second portion.

4. The computer-readable medium of claim 1, wherein granting access to a given requesting entity to at least a portion of the query result of a given persistent data object on the basis of the respective associated security information and an attribute of the given requesting entity comprises:
hiding one or more portions of the query result from the given requesting entity on the basis of the security information and the attribute of the requesting entity.

5. The computer-readable medium of claim 1, wherein the query result is defined using an instance of a Java® RowSet class and the persistent data object is defined using an instance of an extension to the Java® RowSet class.

6. The computer-readable medium of claim 1, wherein the security information defines a link to security settings in the one or more databases.

7. A computer-readable storage medium containing a program which, when executed by a processor, performs a process of managing access by multiple users to a limited subset of data, the process comprising:
(a) executing a query against one or more databases;
(b) attaching security information to the limited subset of data, wherein the limited subset of data comprises a dataset obtained from the one or more databases in response to executing the query;
(c) storing the limited subset of data and the attached security information as a persistent data object;
(d) repeating steps (a)-(c) to produce a plurality of persistent data objects, each having respective limited subsets of data and attached security information; whereby each of the persistent data objects is detached from the one or more databases from which the respective limited subset of data was obtained so that the persistent data objects are independently accessible on the basis of the respective security information contained within the respective persistent data object; and
allowing access to the limited subsets of data by the multiple users, whereby the access by a particular user is dependent on one or more attributes of the particular user and the respective security information attached to the respective limited subset of data; wherein when access to a respective limited subset of data of a given persistent data object is prevented on the basis of the one or more attributes of the particular user and the respective security information, initiating a late binding of external security information to the given persistent data object, wherein the external security information is retrieved from a data source external to the given persistent data object.

8. The computer-readable medium of claim 7, wherein the one or more attributes of the particular user include at least one of:
(i) a user name;
(ii) a role of the user; and
(iii) an authorization level of the user.

9. The computer-readable medium of claim 7, wherein the process further comprises:
allowing one or more of the users to modify the subset of data; and
subsequently synchronizing the one or more databases with the modified subset of data.

10. The computer-readable medium of claim 7, wherein the query is received from a user, and access to the limited subset of data by the user is restricted by modifying the query received from the user to remove one or more results fields from the query based on the security information attached to the limited subset of data and one or more attributes of the user.

11. The computer-readable medium of claim 7, wherein access to the limited subset of data by a user is restricted by presenting the user with only a limited portion of the limited subset of data obtained by executing a query, received from the user, against the limited subset of data, based on the security information attached to the limited subset of data and one or more attributes of the user.

12. A system, comprising:
one or more databases having data; and
a query manager configured for:

(a) executing a query against one or more databases;
(b) attaching security information to the limited subset of data, wherein the limited subset of data comprises a dataset obtained from the one or more databases in response to executing the query;
(c) storing the limited subset of data and the attached security information as a persistent data object;
(d) repeating steps (a)-(c) to produce a plurality of persistent data objects, each having respective limited subsets of data and attached security information; whereby each of the persistent data objects is detached from the one or more databases from which the respective limited subset of data was obtained so that the persistent data objects are independently accessible on the basis of the respective security information contained within the respective persistent data object; and allowing access to the limited subsets of data by the multiple users, whereby the access by a particular user is dependent on one or more attributes of the particular user and the respective security information attached to the respective limited subset of data; wherein when access to a respective limited subset of data of a given persistent data object is prevented on the basis of the one or more attributes of the particular user and the respective security information, initiating a late binding of external security information to the given persistent data object, wherein the external security information is retrieved from a data source external to the given persistent data object.

\* \* \* \* \*